United States Patent
Sawhney et al.

(10) Patent No.: US 8,544,003 B1
(45) Date of Patent: Sep. 24, 2013

(54) SYSTEM AND METHOD FOR MANAGING VIRTUAL MACHINE CONFIGURATIONS

(75) Inventors: Harvinder Singh Sawhney, Haryana (IN); Suman Saraf, Haryana (IN); Rosen Sharma, Los Gatos, CA (US)

(73) Assignee: McAfee, Inc., Santa Clara, CA (US)

( * ) Notice: Subject to any disclaimer, the term of this patent is extended or adjusted under 35 U.S.C. 154(b) by 618 days.

(21) Appl. No.: 12/636,414

(22) Filed: Dec. 11, 2009

Related U.S. Application Data (60) Provisional application No. 61/201,699, filed on Dec. 11, 2008.

(51) Int. Cl.
| | |
|---|---|
| G06F 9/455 | (2006.01) |
| G06F 17/00 | (2006.01) |
| G06F 9/00 | (2006.01) |
| G06F 15/177 | (2006.01) |
| G06F 15/00 | (2006.01) |
| G06F 15/173 | (2006.01) |

(52) U.S. Cl.
USPC .......... 718/1; 726/1; 726/2; 726/12; 709/220; 709/223; 709/238

(58) Field of Classification Search
None
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner* — Qing Wu
(74) *Attorney, Agent, or Firm* — Patent Capital Group (57) ABSTRACT

A method in one example implementation includes receiving a plurality of command messages through a control channel and reconstructing the command messages to determine an intended command for one or more virtual machines on a server device. The command messages include one or more criteria and the intended command corresponds to an operation defined in a policy database. The method also includes determining whether the corresponding operation is permitted by comparing one or more policies associated with the operation to the one or more criteria. The method further includes sending the command messages to the server device if the operation is permitted. In more specific embodiments, the operation may include one of creating, cloning, deleting, starting, stopping, and modifying the one or more virtual machines.

20 Claims, 3 Drawing Sheets

(56) References Cited

U.S. PATENT DOCUMENTS

| | | | |
|---|---|---|---|
| 5,907,860 A | 5/1999 | Garibay et al. | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,073,142 A | 6/2000 | Geiger et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,321,267 B1 | 11/2001 | Donaldson | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,587,877 B1 | 7/2003 | Douglis et al. | |
| 6,611,925 B1 | 8/2003 | Spear | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 | 8/2009 | Chebolu et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,698,744 B2 | 4/2010 | Fanton et al. | |
| 7,703,090 B2 | 4/2010 | Napier et al. | |
| 7,757,269 B1 | 7/2010 | Roy-Chowdhury et al. | |
| 7,765,538 B2 | 7/2010 | Zweifel et al. | |
| 7,809,704 B2 | 10/2010 | Surendran et al. | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,849,507 B1 | 12/2010 | Bloch et al. | |
| 7,908,653 B2 | 3/2011 | Brickell et al. | |
| 7,937,455 B2 | 5/2011 | Saha et al. | |
| 7,966,659 B1 | 6/2011 | Wilkinson et al. | |
| 7,996,836 B1 | 8/2011 | Mccorkendale et al. | |
| 8,015,388 B1 | 9/2011 | Rihan et al. | |
| 8,015,563 B2 | 9/2011 | Araujo et al. | |
| 2002/0056076 A1 | 5/2002 | Made | |
| 2002/0069367 A1 | 6/2002 | Tindal et al. | |
| 2002/0083175 A1 | 6/2002 | Afek et al. | |
| 2002/0099671 A1 | 7/2002 | Mastin et al. | |
| 2003/0014667 A1 | 1/2003 | Kolichtchak | |
| 2003/0023736 A1 | 1/2003 | Abkemeier | |
| 2003/0033510 A1 | 2/2003 | Dice | |
| 2003/0073894 A1 | 4/2003 | Chiang et al. | |
| 2003/0074552 A1 | 4/2003 | Olkin et al. | |
| 2003/0120601 A1 | 6/2003 | Ouye et al. | |
| 2003/0120811 A1 | 6/2003 | Hanson et al. | |
| 2003/0120935 A1 | 6/2003 | Teal et al. | |
| 2003/0145232 A1 | 7/2003 | Poletto et al. | |
| 2003/0163718 A1 | 8/2003 | Johnson et al. | |
| 2003/0167399 A1 | 9/2003 | Audebert et al. | |
| 2003/0200332 A1* | 10/2003 | Gupta et al. | 709/238 |
| 2003/0212902 A1 | 11/2003 | van der Made | |
| 2003/0220944 A1 | 11/2003 | Schottland et al. | |
| 2003/0221190 A1 | 11/2003 | Deshpande et al. | |
| 2004/0003258 A1 | 1/2004 | Billingsley et al. | |
| 2004/0015554 A1 | 1/2004 | Wilson | |
| 2004/0051736 A1 | 3/2004 | Daniell | |
| 2004/0054928 A1 | 3/2004 | Hall | |
| 2004/0143749 A1 | 7/2004 | Tajali et al. | |
| 2004/0167906 A1 | 8/2004 | Smith et al. | |
| 2004/0230963 A1 | 11/2004 | Rothman et al. | |
| 2004/0243678 A1 | 12/2004 | Smith et al. | |
| 2004/0255161 A1 | 12/2004 | Cavanaugh | |
| 2005/0018651 A1 | 1/2005 | Yan et al. | |
| 2005/0086047 A1 | 4/2005 | Uchimoto et al. | |
| 2005/0108516 A1 | 5/2005 | Balzer et al. | |
| 2005/0108562 A1 | 5/2005 | Khazan et al. | |
| 2005/0114672 A1 | 5/2005 | Duncan et al. | |
| 2005/0132346 A1 | 6/2005 | Tsantilis | |
| 2005/0228990 A1 | 10/2005 | Kato et al. | |
| 2005/0235360 A1 | 10/2005 | Pearson | |
| 2005/0257207 A1 | 11/2005 | Blumfield et al. | |
| 2005/0257265 A1 | 11/2005 | Cook et al. | |
| 2005/0260996 A1 | 11/2005 | Groenendaal | |
| 2005/0262558 A1 | 11/2005 | Usov | |
| 2005/0273858 A1 | 12/2005 | Zadok et al. | |
| 2005/0283823 A1 | 12/2005 | Okajo et al. | |
| 2005/0289538 A1 | 12/2005 | Black-Ziegelbein et al. | |
| 2006/0004875 A1 | 1/2006 | Baron et al. | |
| 2006/0015501 A1 | 1/2006 | Sanamrad et al. | |
| 2006/0037016 A1 | 2/2006 | Saha et al. | |
| 2006/0080656 A1 | 4/2006 | Cain et al. | |
| 2006/0085785 A1 | 4/2006 | Garrett | |
| 2006/0101277 A1 | 5/2006 | Meenan et al. | |
| 2006/0133223 A1 | 6/2006 | Nakamura et al. | |
| 2006/0136910 A1 | 6/2006 | Brickell et al. | |
| 2006/0136911 A1 | 6/2006 | Robinson et al. | |
| 2006/0195906 A1 | 8/2006 | Jin et al. | |
| 2006/0200863 A1 | 9/2006 | Ray et al. | |
| 2006/0230314 A1 | 10/2006 | Sanjar et al. | |
| 2006/0236398 A1 | 10/2006 | Trakic et al. | |
| 2006/0259734 A1 | 11/2006 | Sheu et al. | |
| 2007/0011746 A1 | 1/2007 | Malpani et al. | |
| 2007/0028303 A1 | 2/2007 | Brennan | |
| 2007/0039049 A1 | 2/2007 | Kupferman et al. | |
| 2007/0050579 A1 | 3/2007 | Hall et al. | |
| 2007/0050764 A1 | 3/2007 | Traut | |
| 2007/0074199 A1 | 3/2007 | Schoenberg | |
| 2007/0083522 A1 | 4/2007 | Nord et al. | |
| 2007/0101435 A1 | 5/2007 | Konanka et al. | |
| 2007/0136579 A1 | 6/2007 | Levy et al. | |
| 2007/0143851 A1 | 6/2007 | Nicodemus et al. | |

| | | |
|---|---|---|
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2010/0071035 A1* | 3/2010 | Budko et al. .................... 726/4 |
| 2010/0100970 A1 | 4/2010 | Chowdhury et al. |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0119760 A1 | 5/2011 | Sebes et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0278853 A1 | 11/2012 | Chowdhury et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, Retrieved and printed Oct. 12, 2009, 1 page.

Secure Mobile Computing, Website: http://www.vmware.com/solutions/desktop/mobile.html, Retrieved and printed Oct. 12, 2009, 2 pages.

Barrantes et al., "Randomized Instruction Set Emulation to Dispurt Binary Code Injection Attacks," Oct. 27-31, 2003, ACM, pp. 281-289.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Gaurav et al., "Countering Code-Injection Attacks with Instruction-Set Randomization," Oct. 27-31, 2003, ACM, pp. 272-280.

IA-32 Intel® Architecture Software Developer's Manual, vol. 3B; Jun. 2006; pp. 13, 15, 22 and 145-146.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

* cited by examiner

SYSTEM AND METHOD FOR MANAGING VIRTUAL MACHINE CONFIGURATIONS

CROSS-REFERENCE TO RELATED APPLICATION

This application claims the benefit of priority under 35 U.S.C. §119(e) of U.S. Provisional Application No. 61/201,699, filed Dec. 11, 2008, by Sharma et al., entitled "VM CHANGE ENFORCEMENT," which is hereby incorporated by reference in its entirety.

TECHNICAL FIELD

This disclosure relates in general to the field of security and, more particularly, to managing virtual machine configurations in a virtual environment.

BACKGROUND

The field of network security has become increasingly important in today's society. In particular, the ability to effectively maintain secure and stable computers and systems presents a significant obstacle for component manufacturers, system designers, and network operators. This obstacle is made even more complicated due to the increased ease with which network systems may be manipulated, particularly in a virtualized environment. Virtualization is a software technology allowing an operating system (OS) to run in an isolated virtual environment (typically referred to as a virtual machine), where a platform's physical characteristics and behaviors are reproduced. More specifically, a virtual machine can represent an isolated, virtual environment running its own operating system and applications and being equipped with virtual hardware (processor, memory, disks, network interfaces, etc.). Commonly, the virtual machine is managed by a virtualization product. A virtual machine monitor (VMM) is the virtualization software layer that manages hardware requests from a guest OS (e.g., simulating answers from real hardware). A hypervisor is computer software/hardware platform virtualization software that may run on bare hardware and allows multiple operating systems to run on a host computer concurrently. ESX and ESXi by VMware, Inc. of Palo Alto, Calif., Xen by Citrix Systems, Inc. of Ft. Lauderdale, Fla., and Hyper-V by Microsoft Corp. of Redmond, Wash., represent forms of VMMs and these VMMs can be managed to better protect computers and systems from authorized and unauthorized manipulations that may affect system stability and security.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes receiving a plurality of command messages through a control channel. The plurality of command messages may have one or more criteria. The method also includes reconstructing the plurality of command messages to determine an intended command for configuring one or more virtual machines on a server device. The intended command has a corresponding operation in a policy database and the operation may have one or more associated policies. The method further includes determining if the operation is permitted by comparing one or more policies associated with the operation to the one or more criteria. The method also includes sending the plurality of command messages to the server device if the operation is permitted. In more specific embodiments, the operation may include one of creating, cloning, deleting, starting, stopping, and modifying the one or more virtual machines. In other more specific embodiments, the server device is adapted to perform the operation only if a control proxy sends the plurality of command messages to the server device, and the control proxy is adapted to receive only the plurality of command messages through the control channel.

Example Embodiments

Figure 1:
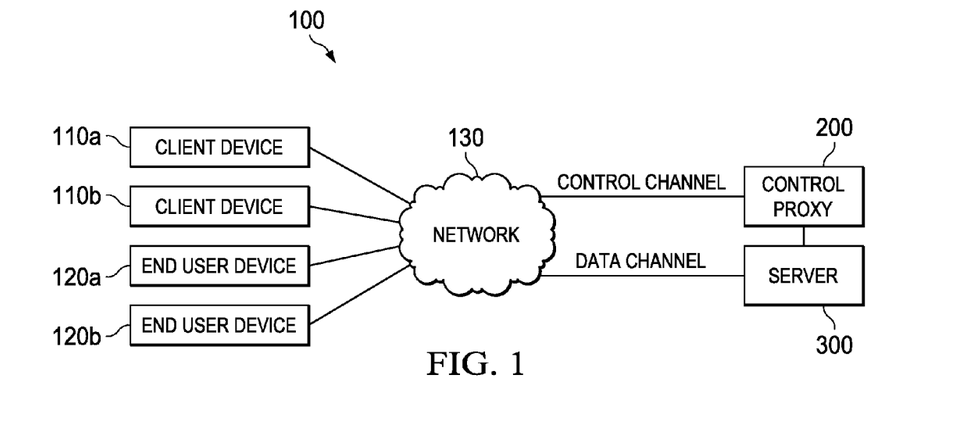
FIG. 1 is a pictorial representation of one embodiment of a network environment in which a system and method for managing virtual machine configurations may be implemented.

FIG. 1 is a simplified block diagram of a network environment 100 in which a system for managing virtual machine configurations may be implemented. Network environment 100 may include a server 300 accessed by different clients through a communication link provided by network 130. The different clients may include client devices 110a and 110b, which represent users having administrative privileges to configure server 300, and end user devices 120a and 120b, which represent end users who access applications or services provided by server 300. In one embodiment, server 300 may be configured to host one or more virtual machines. A control proxy 200 may be operably connected to client devices 110a and 110b for receiving configuration commands through a control channel. Control proxy 200 may also be operably connected to server 300, for sending permitted configuration commands received from client devices 110a and 110b to server 300. Server 300 may send and receive data messages across a data channel for communicating with end user devices 120a and 120b.

In example embodiments, a system and method for managing virtual machine configurations may be implemented in network environment 100, providing control proxy 200 for intercepting command messages being sent from a user of client device 110a or 110b to configure virtual machines in server 300. Control proxy 200 interprets the particular protocol command messages to determine which command was intended by the user. Control proxy 200 then checks selected criteria of the command messages against predefined policies to determine whether an operation corresponding to the intended command is permitted. If the operation is permitted, then control proxy 200 sends the command messages to server 300. For purposes of illustrating the techniques of such a system, it is important to understand the activities occurring within a given virtual environment. The following foundational information may be viewed as a basis from which the present disclosure may be properly explained. Such information is offered earnestly for purposes of explanation only and, accordingly, should not be construed in any way to limit the broad scope of the present disclosure and its potential applications.

Protecting a virtual computer environment presents certain complexities that are not associated with a purely physical computer environment. When physical computers are initially configured within a network, physical wires may be connected to the computers, wiring arrangements to appropriate physical components may be configured, memory components may be added, external devices may be added, and the like. Appropriate security may also be included. For example, firewalls may be configured in both hardware and software, proxy servers may be configured between computers, and any other desired security mechanism may be implemented. Modifications to the physical computer may require adding or removing physical components and adding, removing, or rerouting wiring. Thus, such procedures may be labor intensive and consequently, may be performed only as time and manual labor allows. Such changes in a physical environment may necessitate planning and deliberation. For example, in many business environments, implementations and modifications to physical systems are often scheduled during off-hours or work downtime, so as not to interfere with daily business transactions. Even if changes must be made during working hours, end users are typically notified of the impending work and any expected downtime.

In a virtual environment, however, a hypervisor or virtual machine monitor may control the operation of one or more virtual machines, each having an associated operating system and one or more associated applications. The hypervisor is the basic abstraction layer of software that may sit directly on the hardware of a virtual machine host below operating systems. It is responsible for central processing unit (CPU) scheduling and memory partitioning of the various virtual machines running on a hardware device. The hypervisor not only abstracts the hardware for the virtual machines, but also controls the execution of virtual machines as they share the common processing environment.

The initial configuration and any subsequent modifications of a virtual machine may occur by simply sending electronic commands to a virtual machine host. Such commands may be issued by anyone with appropriate privileges who can access the virtual machine host. Thus, virtual machines may be configured (e.g., created, cloned, deleted, started, stopped, modified, etc.) simply by an authorized user typing in commands, which are received and performed on the virtual machine host. Such configurations may be accomplished with greater speed and frequency than in a physical environment. In addition, because of the transparency and ease with which such configuration commands may be issued, multiple individuals with appropriate privileges could actually issue conflicting commands, thereby potentially causing frequent and perhaps undesirable changes to the virtual machines. Moreover, these changes could occur anytime, such as during peak working hours, without warning to end users and possibly resulting in undesirable affects on end users and any associated business activities. Virtual machines may also incur substantial damage if a security hacker or other unauthorized user penetrates the virtual environment, at least in part because the hacker may have access to multiple operating systems and applications.

While the isolation provided by a virtual environment may offer more security from attacks by malicious code and abnormal process ends from an application or operating system, virtual machines may, on the other hand, be more easily manipulated by network administrators and other authorized users than in a purely physical environment. For example, in virtual machine environments such as VMware ESX or VMware ESXi, any individual, such as a network administrator, with appropriate privileges may be allowed to simply type in commands to edit hardware configurations for any of the virtual machines on a host server. A virtual machine may be created, cloned, or deleted, or any virtual machine hardware configurations (e.g., processors, CD/DVD drives, floppy drives, memory, SCSI devices, network adapters, parallel ports, serial ports, etc.) may be added, removed or modified. Moreover, such configuration commands may be issued at any time, from any device so long as the user is authorized (e.g., has a valid password). Thus, without proper controls, the potential for such commands to be issued during a time that disrupts business activities is great. In addition, because configuration commands may be issued from various locations, authorized users could issue conflicting commands that cause problems for the end users and disruptions to associated business activities.

In one example scenario, many companies or organizations that conduct their businesses using large network systems may outsource their information technology (IT) support to a separate IT organization. Once the IT organization is given access and administrative privileges to the company's network, the company may have limited control over the activities undertaken by the IT organization to configure the virtual machines used by the company. Even well-intentioned configuration changes have the potential to disrupt business activities when performed during working hours without prior approval from and notice to the network owner. Thus, many companies in this scenario would benefit from a way to define policies that control the IT support organization's ability to modify virtual machine configurations within the network.

Hackers or other unauthorized users may also present problems in the virtual environment. Such individuals may attempt to gain administrative privileges on a virtual machine host server, such as, by acquiring an appropriate password and access to the network. If successful, the hacker or other unauthorized user may cause irreparable damage by issuing configuration commands and thereby adding, removing, or modifying the virtual machines and any associated virtual hardware. Thus, it has become very important to control or manage access to virtual machines based on configuration commands and defined policies associated with such configuration commands.

A system for managing virtual machine configurations, as outlined in FIG. 1, can resolve many of these issues. In accordance with one example implementation, a company or other organization that provides applications or services on network servers configured as virtual machine hosts can define policies that determine, for example, when and by whom particular configuration commands may be sent to the servers. These policies may be defined and evaluated in a control proxy that receives the configuration commands through a control channel from client devices. Also, the servers may be disabled from performing operations in response to configuration commands unless the commands are received from the control proxy. Thus, such a system would give companies or other organizations control over when and how their servers could be configured by network administrators and other users with administrative privileges.

Generally, virtual machine monitors (e.g., VMware ESX, VMware ESXi, Xen, Hyper-V, etc.) are hypervisors that can be employed to manage virtual machines and guest operating system (OS) instances. As used herein in this Specification, the term 'virtual machine monitor' is meant to include any such hypervisors, or other devices that can operate to manage one or more virtual machines.

Turning to the infrastructure of FIG. 1, a system for managing virtual machine configurations may be implemented in network environment 100, which may include additional servers, client devices, control proxies, and other devices not shown. Network environment 100 may be configured in any form including, but not limited to, local area networks (LANs), intranets, and wide area networks (WANs) such as the Internet. In one embodiment, client devices 110a and 110b and end user devices 120a and 120b may be operably coupled to network 130 (e.g., the Internet) by an Internet Service Provider (ISP) or through an Internet Server with dedicated bandwidth. In this embodiment, connections to network 130 may include any appropriate medium such as, for example, digital subscriber lines (DSL), telephone lines, T1 lines, T3 lines, wireless, satellite, fiber optics, cable, Ethernet, etc. or any combination thereof. In addition, gateways, routers, and the like may be used to facilitate electronic communication between client devices 110a and 110b and control proxy 200 and between end user devices 120a and 120b and server 300. Also, appropriate firewalls may be provided between network 130 and control proxy 200 and server 300. In another embodiment network 130 may represent a LAN to which client devices 110a and 110b are operably connected to communicate with control proxy 200 and to which end user devices 120a and 120b are operably connected to communicate with server 300. Network 130 may, in further embodiments, be implemented as a number of different combinations of networks, including for example, client device 110a and end user device 120a connected through a LAN and client device 110b and end user device 120b connected through the Internet.

Control proxy 200 and server 300 are operably connected to network 130. Logically, network 130 may be connected to control proxy 200 through the control channel for sending configuration command messages to control proxy 200 from client devices 110a and 110b. Network 130 may also be logically connected to server 300 through the data channel for sending data messages between end user devices 120a and 120b and server 300. In one embodiment, control proxy 200 does not receive data messages from client devices 110a and 110b or end user devices 120a and 120b. Rather, control proxy 200 is configured to only receive messages through the control channel, which include configuration command messages. One example embodiment includes network 130 supporting Simple Object Access Protocol (i.e., SOAP) messaging framework. SOAP is a protocol that may combine remote procedure calls (i.e., RPC) and Hypertext Transport Protocol (i.e., HTTP), allowing HTTP to be used as the transport for RPC messages. Although SOAP messages may be used in this example implementation, it will be apparent that the broad scope of the present disclosure could also be applied using other protocols.

In one example embodiment, control proxy 200 and server 300 may be implemented in an IT Headquarters of an organization or a data center, with client devices 110a and 110b being computers operated by individual users having network administrator privileges (e.g., authorization to configure and maintain computers, servers, and any other devices within a computer network). In this embodiment, end user devices 120a and 120b may be computers operated by users without administrative privileges, who remotely or locally access applications or services provided by server 300. Server 300 may provide applications or services only to end users within the organization that controls server 300 (e.g., employees) or it may provide applications or services to end users outside the organization (e.g., customers, Internet surfers, other businesses). Client devices 110a and 110b may include computers such as desktops, laptops, or any other computing device or console capable of sending configuration command messages to control proxy 200, using, for example the SOAP protocol. End user devices 120a and 120b may include computers such as desktops, laptops, or mobile or handheld computing devices (e.g., personal digital assistants (PDAs) or mobile phones) or any other computing device capable of receiving and sending data messages to server 300 through network 130. It should be noted that the network configurations and interconnections shown and described herein are for illustrative purposes only. One of ordinary skill in the art will appreciate that FIG. 1 is intended as an example and should not be construed to imply architectural limitations in the present disclosure.

Figure 2:
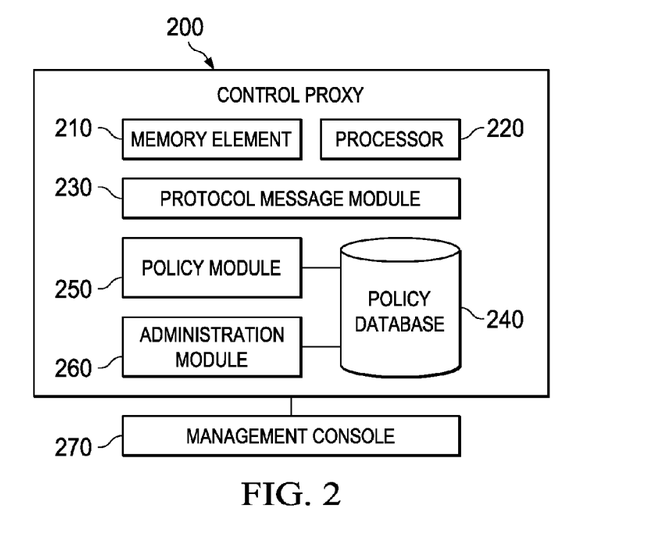
FIG. 2 is a simplified block diagram of one embodiment of a system and method for managing virtual machine configurations, which may be implemented as a control proxy.

Turning to FIG. 2, a simplified block diagram illustrates one embodiment of control proxy 200 that may be implemented in accordance with the present disclosure. Control proxy 200 may include hardware elements such as a memory element 210 and a processor 220 suitably configured to provide a platform for associated modules of control proxy 200. In addition, a suitable operating system (not shown) may be configured in control proxy 200 to appropriately manage the operation of hardware components therein. Control proxy 200 may include a protocol message module 230 for receiving configuration command messages. Protocol message module 230 understands the particular protocol (e.g., SOAP, etc.) of the command messages and determines the intended command of a user sending the command messages. Also included in control proxy 200 could be a policy database 240, a policy module 250 and an administration module 260. Policy database 240 may include entries corresponding to operations capable of being performed in server 300 and also may include entries corresponding to predefined policies associated with the operations. A management console 270 may be operably coupled to control proxy 200 for creating and/or updating policy database 240 with administration module 260. In one embodiment, management console 270 may be a McAfee ePolicy Orchestrator®.

Figure 3:
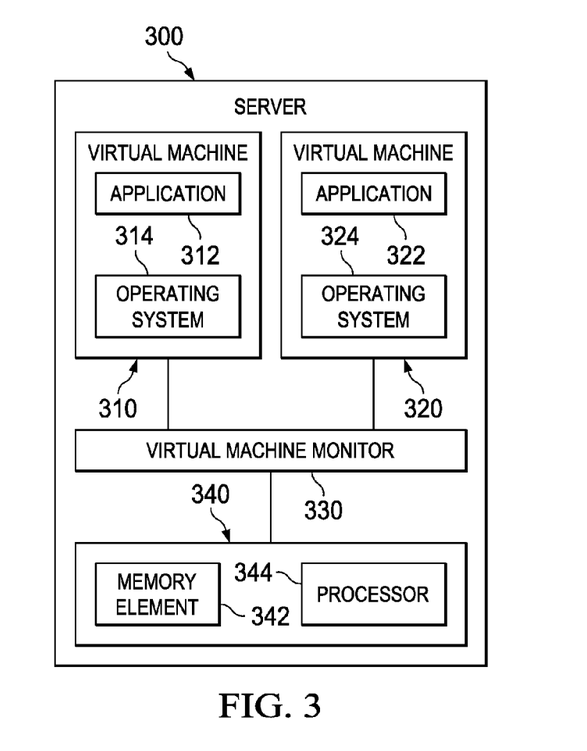
FIG. 3 is a simplified block diagram illustrating one example implementation of a server in a system and method for managing virtual machine configurations.

Turning to FIG. 3, a simplified block diagram illustrates a server 300 that may be implemented in accordance with the present disclosure. Server 300 may be configured with, for example, VMware ESX or ESXi, SAP or other web services. In one example embodiment shown in FIG. 3, server 300 may include a virtual machine 310 and a virtual machine 320, which have respective operating systems 314 and 324 running respective applications 312 and 322. Server 300 may also include a virtual machine monitor (VMM) 330, which is, in one embodiment, a hypervisor that runs on hardware and which provides the capability of running multiple instances of operating systems 314 and 324 and associated applications 312 and 322, concurrently, by dynamically allocating the hardware resources to the operating systems 314 and 324 and applications 312 and 322 as needed. In this arrangement, applications 312 and 322 are logically run on top of respective operating systems 314 and 324, which are associated with respective virtual machines 310 and 320, and are provided with virtual hardware (e.g., processors, CD/DVD drives, floppy drives, memory, SCSI devices, network adapters, parallel ports, serial ports, etc.). Hardware components 340 beneath virtual machine monitor 330 may include a memory element 342 and a processor 344. Hardware components 340 may also include additional components such as, for example, network interface cards and disk drives. The entire configuration may be provided in a server (or some other network appliance). This implementation is only representing one possible example to which the present disclosure can apply. Any number of additional hypervisors or virtual elements could similarly benefit from the broad teachings discussed herein.

Typically, in server virtualization an authorized user is provided with an interface to manage a complete setup of virtual machines and the associated applications, operating systems, and virtual hardware. This management includes the hypervisor configuration and virtual machine configuration, including creation, deletion, modification, shutdown, startup, etc. In accordance with one embodiment of the present disclosure, server 300 is configured in "local access lockdown" such that even authorized users cannot successfully issue configuration commands directly to server 300. Instead, only configuration commands received from control proxy 200 will be performed. Thus, even if a user with administrative privileges bypasses control proxy 200 and connects directly to server 300, any configuration commands attempted by the user will not be executed because only configuration commands received in messages from control proxy 200 will be executed by server 300.

Not shown in FIGS. 2 and 3 is additional hardware that may be suitably coupled to control proxy processor 220 and server processor 344. Additional hardware may be in the form of memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements, etc.

Figure 4:
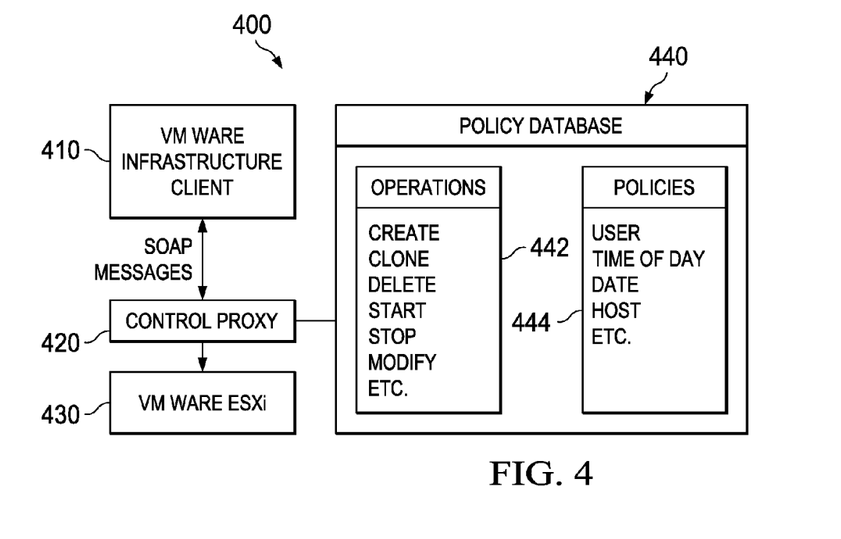
FIG. 4 is a simplified block diagram of one example embodiment of a system and method for managing virtual machine configurations.

Turning to FIG. 4, FIG. 4 is a simplified block diagram illustrating one implementation of a system 400 for managing virtual machine configurations in accordance with the present disclosure. In the example implementation, a VMware Infrastructure Client (i.e., VI client) 410 may be suitably coupled to a control proxy 420 for sending and receiving SOAP messages as previously described herein. Control proxy 420 may be operably connected to a VMware ESXi server 430 for sending permitted configuration command messages, received from VI client 410, to ESXi server 430. By way of example, a policy database 440 is shown with enumerated operations 442 (i.e., create, clone, delete, start, stop, modify, etc.) and policies 444 (i.e., user, time of day, date, host, etc.).

VI client 410 may allow an authorized user to select virtual machine configuration commands that correspond to operations for ESXi server 430, such as, for example, creating, cloning, starting, stopping, deleting, and modifying virtual machines, which includes any associated virtual hardware. Once the user has selected a command, VI client 410 may create SOAP messages to communicate the selected commands to ESXi server 430. Multiple SOAP messages may be sent for each command selected by the user, with the SOAP messages having a plurality of criteria such as user, host address, date, time of day, etc. embedded therein. Control proxy 420 intercepts the SOAP messages and reconstructs the messages to determine which configuration command was intended. One of the operations 442 in policy database 440 may then be identified as corresponding to the intended command. Once the configuration command and its corresponding operation from policy database 440 have been determined, policies 444 associated with the corresponding operation may be compared to any of the plurality of criteria from the SOAP messages to determine whether the corresponding operation is permitted. Control proxy 420 may then send the SOAP messages to ESXi server 430 if the corresponding operation is permitted. If the corresponding operation is not permitted, however, the control proxy 420 may send an error message back to the VI client 410.

Figure 5:
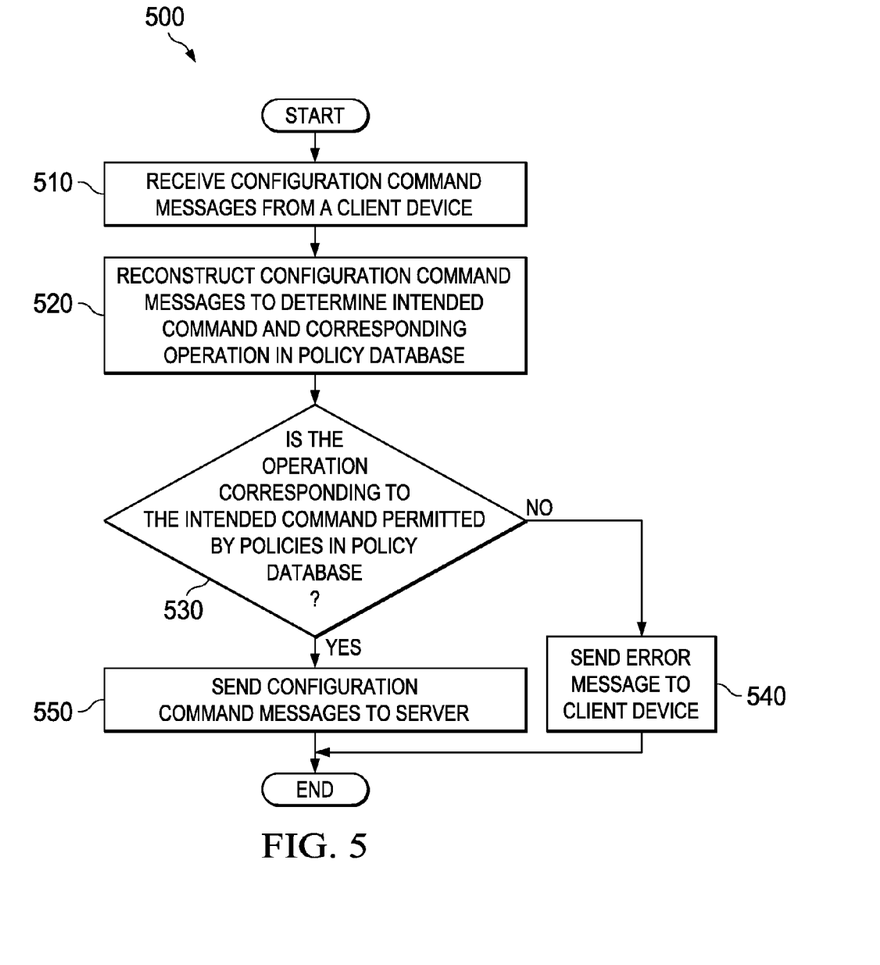
FIG. 5 is a simplified flowchart illustrating a series of example steps associated with a system and method for managing virtual machine configurations in accordance with one embodiment.

Turning to FIG. 5, a simplified flowchart 500 is depicted illustrating a process associated with one implementation for managing virtual machine configurations. The process involves intercepting messages between client devices and a server, determining what configuration commands have been issued in the messages, and determining whether operations corresponding to the intended commands are permissible based on predefined policies. The process may be implemented in control proxy 200 as shown in FIGS. 1 and 2, which may be implemented in any suitable architecture as described herein.

The process may begin at step 510, where control proxy 200 receives configuration command messages from one of the client devices 110a or 110b. Because the configuration command options may be provided on client device 110a or 110b at a user-understandable level, typically, one user action will result in many messages being sent. Therefore, flow passes to step 520 to reconstruct the plurality of configuration command messages to determine what command the user intended, and to determine an operation in policy database 240 corresponding to the intended command. Once the configuration command messages have been reconstructed and the corresponding operation in policy database 240 has been determined, flow passes to step 530 to determine if the operation corresponding to the intended command is permitted by associated policies in the policy database 240. In this step, policies associated with the corresponding operation in policy database 240 may be compared to selected criteria from the configuration command messages. If the associated policies do not permit the corresponding operation to be performed, based on the selected criteria, flow passes to step 540 and an error message may be sent to the particular client device 110a or 110b that sent the configuration command messages. However, if the corresponding operation is permitted, then flow passes to step 550 and the configuration command messages are sent to server 300.

In one example implementation, a policy ("Policy T") may be defined in policy database 240 as not allowing particular operations to be performed by any users from any client devices or hosts during a specified time of day, such as normal business hours (e.g., 9 am-5 pm). By way of example, Policy T may then be mapped to operations "delete", "stop", and "modify" in policy database 240 for all authorized users and all authorized hosts. If an authorized user initiates a command on client device 110a or 110b at 12 pm to modify the memory of virtual machine 310 or 320 in server 300, configuration command messages would be intercepted by control proxy 200. Control proxy 200 would determine the intended command from the configuration command messages and would then determine that the intended command corresponds to the "modify" operation in the policy database 240. The time of day (i.e., 12 pm) the command messages were issued would be determined from the plurality of criteria embedded in the command messages. When the time of day (i.e., 12 pm) is compared to Policy T, which is mapped to the "modify" operation in policy database 240, it would be determined that the modify operation is not permitted and, therefore, the configuration command messages would not be sent to server 300. Instead, an error message may be sent to the appropriate client device 110*a* or 110*b*. However, if the same authorized user initiated the same command at 6 pm, then, when the time of day (i.e., 6 pm) is compared to Policy T, it would be determined that the modify operation is permitted and therefore, the configuration command messages would be sent to server 300. It will be apparent that this is just one example scenario, and that many other selected criteria, such as, for example, the host, the date, the user, etc., may be evaluated and that the control proxy would determine whether the operation corresponding to the intended command is permitted or not permitted based on the particular policies associated with the operation.

Software for managing virtual machine configurations can be provided at various locations (e.g., within policy module 250, administration module 260, protocol message module 230). In one example implementation, this software is resident in a computer sought to be protected from a security attack (or protected from unwanted or unauthorized manipulations of a writable memory area). In other embodiments, software could be received or downloaded from a web server (e.g., in the context of purchasing individual end-user licenses for separate devices, separate control proxies, separate virtual machines, hypervisors, servers, etc.) in order to provide this system for managing virtual machine configurations.

In other examples, the system and method for managing virtual machine configurations could involve a proprietary element (e.g., as part of an antivirus solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As used herein in this Specification, the term 'computer' is meant to encompass these possible elements (VMMs, hypervisors, virtual devices, network appliances, routers, switches, gateway, processors, servers, loadbalancers, firewalls, or any other suitable device, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective management of virtual machine configurations. In addition, the system functions can be consolidated in any suitable manner. Along similar design alternatives, any of the illustrated modules and components of FIGS. 1-4 may be combined in various possible configurations: all of which are clearly within the broad scope of this Specification.

In certain example implementations, the functions of managing virtual machine configurations outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIGS. 2 and 3) can store data used for the operations described herein. This includes the memory element being able to store software, logic, code, or processor instructions that are executed to carry out the activities described in this Specification. A processor can execute any type of instructions to achieve the operations detailed herein in this Specification. In one example, the processors (as shown in the FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., a computer, a server, a control proxy, a network appliance, a firewall, a virtual machine monitor, any other type of virtual element, etc.) can include memory elements for storing information to be used in achieving the management of virtual machine configurations as outlined herein. Additionally, each of these devices may include a processor that can execute software or an algorithm to perform the management of virtual machine configurations activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., policy database, etc.) should be construed as being encompassed within the broad term 'memory element.' Similarly, any of the potential processing elements, modules, and machines described in this Specification should be construed as being encompassed within the broad term 'processor.' Each of the computers, network appliances, virtual elements, etc. can also include suitable interfaces for receiving, transmitting, and/or otherwise communicating data or information in a secure environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that the networks and systems of FIGS. 1 and 4 (and their teachings) are readily scalable. The system implemented in network environment 100 can accommodate a large number of components, as well as more complicated or sophisticated arrangements and configurations. Accordingly, the examples provided should not limit the scope or inhibit the broad teachings of the system as potentially applied to a myriad of other architectures. In addition, the system has been described herein as operating in conjunction with particular VMware architectures; however, other architectures can readily be accommodated by the present solution.

It is also important to note that the steps described with reference to the preceding FIGURES illustrate only some of the possible scenarios that may be executed by, or within, the system and method for managing virtual machine configurations. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings of the discussed concepts.

What is claimed is:

1. A method, comprising:
   receiving a plurality of command messages through a control channel, wherein the plurality of command messages includes one or more criteria;
   reconstructing the plurality of command messages to determine an intended command for configuring one or more virtual machines on a server device, wherein the intended command corresponds to an operation defined in a policy database;
   determining whether the plurality of command messages are received from a control proxy, wherein the server device is disabled from performing operations associated with the plurality of configuration commands based, at least in part, on whether they are received from the control proxy;
   determining if the operation is permitted by comparing one or more policies associated with the operation to the one or more criteria; and
   sending the plurality of command messages to the server device if the operation is permitted.

2. The method of claim 1, wherein the operation includes one of creating, cloning, deleting, starting, stopping, and modifying the one or more virtual machines.

3. The method of claim 1, wherein the operation includes configuring a selected one of a group of hardware components of one of the virtual machines, the group of hardware components consisting of: a processor, a CD drive, a DVD drive, a floppy drive, a memory element, a SCSI device, a network adapter, a parallel port, and a serial port.

4. The method of claim 1, wherein the plurality of command messages use Simple Object Access Protocol (SOAP) messaging framework.

5. The method of claim 1, wherein the control proxy is adapted to receive only the plurality of command messages through the control channel.

6. The method of claim 1, further comprising,
   creating the policy database with the one or more policies and a plurality of operations for configuring the one or more virtual machines on the server device, wherein the one or more policies are mapped to selected operations of the plurality of operations.

7. The method of claim 1, further comprising:
   sending an error message to be displayed on the client device when the operation corresponding to the intended command is not permitted.

8. The method of claim 1, wherein the one or more criteria includes a user sending the message, a time of day the message is sent, and an address of the client device.

9. The method of claim 1, wherein one of the policies includes a predefined time of day the operation is permissible, and wherein one of the criteria includes the time of day the message is sent.

10. A non-transitory media having logic stored therein to perform operations comprising:
    receiving a plurality of command messages through a control channel, wherein the plurality of command messages includes one or more criteria;
    reconstructing the plurality of command messages to determine an intended command for configuring one or more virtual machines on a server device, wherein the intended command corresponds to an operation defined in a policy database;
    determining whether the plurality of command messages are received from a control proxy, wherein the server device is disabled from performing operations associated with the plurality of configuration commands based, at least in part, on whether they are received from the control proxy;
    determining if the operation is permitted by comparing one or more policies associated with the operation to the one or more criteria; and
    sending the plurality of command messages to the server device if the operation is permitted.

11. The media of claim 10, wherein the operation includes one of creating, cloning, deleting, starting, stopping, and modifying the one or more virtual machines.

12. The media of claim 10, wherein the control proxy is adapted to receive only the plurality of command messages through the control channel.

13. The media of claim 10, the processor being operable to perform operations comprising:
    creating the policy database with the one or more policies and a plurality of operations for configuring the one or more virtual machines on the server device, wherein the one or more policies are mapped to selected operations of the plurality of operations.

14. The media of claim 10, the processor being operable to perform operations comprising:
    sending an error message to be displayed on the client device when the operation corresponding to the intended command is not permitted.

15. The media of claim 10, wherein one of the policies includes a predefined time of day the operation is permissible, and wherein one of the criteria includes the time of day the message is sent.

16. A control proxy, comprising:
    a memory component configured to store a policy database; and
    a processor operable to execute instructions associated with a protocol message module and a policy module, including:
      receiving a plurality of command messages through a control channel, wherein the plurality of command messages includes one or more criteria;
      reconstructing the plurality of command messages to determine an intended command for configuring one or more virtual machines on a server device, wherein the intended command corresponds to an operation defined in a policy database;
      determining whether the plurality of command messages are received from a control proxy, wherein the server device is disabled from performing operations associated with the plurality of configuration commands based, at least in part, on whether they are received from the control proxy;
      determining if the operation is permitted by comparing one or more policies associated with the operation to the one or more criteria; and
      sending the plurality of command messages to the server device if the operation is permitted.

17. The control proxy of claim 16, wherein the operation includes one of creating, cloning, deleting, starting, stopping, and modifying the one or more virtual machines.

18. The control proxy of claim 16, wherein the control proxy is adapted to receive only the plurality of command messages through the control channel.

19. The control proxy of claim 16, wherein the processor is operable to execute instructions associated with an administration module comprising:

creating the policy database with the one or more policies and a plurality of operations for configuring the one or more virtual machines on the server device, wherein the one or more policies are mapped to selected operations of the plurality of operations.

20. The control proxy of claim 16, wherein one of the policies includes a predefined time of day the operation is permissible, and wherein one of the criteria includes the time of day the message is sent.

* * * * *